US 6,743,853 B1

(12) United States Patent
Mitarai

(10) Patent No.: US 6,743,853 B1
(45) Date of Patent: *Jun. 1, 2004

(54) VISCOSITY STABILIZER FOR NATURAL RUBBER, VISCOSITY-STABILIZED NATURAL RUBBER COMPOSITION AND PROCESS FOR PRODUCING THE SAME, AND METHOD OF CONTROLLING RISE IN VISCOSITY OF NATURAL RUBBER

(75) Inventor: Kuninori Mitarai, Kodaira (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/986,167

(22) Filed: Dec. 5, 1997

(30) Foreign Application Priority Data

Dec. 9, 1996 (JP) .............................. 8-328751
Oct. 15, 1997 (JP) .............................. 9-281835

(51) Int. Cl.$^7$ ................................. C08L 7/00
(52) U.S. Cl. ..................... 524/575.5; 523/351
(58) Field of Search ................. 524/525.5; 523/351

(56) References Cited

U.S. PATENT DOCUMENTS 1,455,893 A    5/1923  Stockton ................ 524/575.5
5,696,197 A  * 12/1997 Smith et al. ............ 524/495

FOREIGN PATENT DOCUMENTS

EP    0613924      9/1994
GB    461679 A     2/1937
WO    WO9619531    6/1996

OTHER PUBLICATIONS

Nakajima et al., "Processing Aids for Mixing and Extrusion of Silica–Natural Rubber Compounds", *In Search of Excellence*, Society of Plastic Engineers, vol. 2, pp. 703–706, (May 5, 1991).

Sekhar, B.C., "Degradation and Crosslinking of Polyisoprene in *Hevea Brasiliensis* Latex During Processing and Storage", *J. Polymer Science*, vol. XLVIII, pp. 133–137 (Dec. 1960).

* cited by examiner

*Primary Examiner*—Peter D. Mulcahy
(74) *Attorney, Agent, or Firm*—Sughrue Mion, PLLC

(57) ABSTRACT

Provided are a viscosity stabilizer comprising carbon black and/or silica and further blended with at least one selected from the group consisting of a plasticizer, a processing aid, a softening agent and a dispersant, a viscosity-stabilized natural rubber composition blended with the viscosity stabilizer described above in an amount of 5 to 80 parts by weight per 100 parts by weight of natural rubber, a process for producing a viscosity-stabilized natural rubber composition, which comprises adding the viscosity stabilizer described above to natural rubber in producing a natural rubber master batch, and a method of controlling a rise in the viscosity of natural rubber, which comprises adding the viscosity stabilizer described above to natural rubber in producing a natural rubber master batch.

4 Claims, No Drawings

VISCOSITY STABILIZER FOR NATURAL RUBBER, VISCOSITY-STABILIZED NATURAL RUBBER COMPOSITION AND PROCESS FOR PRODUCING THE SAME, AND METHOD OF CONTROLLING RISE IN VISCOSITY OF NATURAL RUBBER

BACKGROUND OF THE INVENTION

1. Field of the Invention

The present invention relates to a viscosity stabilizer for natural rubber, a viscosity-stabilized natural rubber composition blended with said viscosity stabilizer and a process for producing the same, and a method of controlling a rise in the viscosity of natural rubber in which said viscosity stabilizer is used for controlling a rise in the viscosity of natural rubber.

2. Description of the Related Art

In general, natural rubber is produced in tropical countries such as Thailand, Malaysia and Indonesia. Natural rubber is used much and widely in the rubber industry and the tire industry because of excellent physical properties thereof.

Natural rubber has as low Mooney viscosity (JIS K6300) as 60 to 70 immediately after production, but the viscosity rises close to 90 to 100 with the passage of time during storage and transportation to Japan.

This phenomenon is called gelation (storage hardening), and it is generally noted that an aldehyde group contained in an isoprene chain of natural rubber reacts with protein and amino acids to cause the gelation. However, the mechanism thereof has not yet distinctly been clarified.

Gelation of natural rubber caused in production sites deteriorates the processability in producing rubber products and therefore has to be prevented.

In order to prevent this gelation, natural rubber latex is processed with 0.08 to 0.30% of hydroxylamine sulfate [$(NH_2OH)_2 \cdot H_2SO_4$] to prepare a viscosity-stabilized natural rubber composition in Rubber Research Institute of Malaysia (RRIM). Further, a type of composition (SMR-GP) obtained by blending dried natural rubber with a solution of hydroxylamine sulfate described above has been developed as well.

However, the viscosity-stabilized natural rubber composition obtained by using hydroxylamine sulfate has the following problems:

(1) Hydroxylamine sulfate is designated as a poison in Japan and therefore hardly used.
(2) A rise in the viscosity is observed at the beginning of storage.
(3) A viscosity-stabilizing effect is low under a severe condition (in an oven of about 60° C.).
(4) Compatibility with rubber is inferior, and therefore there is a fear of bad dispersibility.
(5) The decomposition temperature is low, and therefore a sufficiently high effect can not be obtained in kneading at high temperatures.

On the other hand, semicarbazide ($NH_2NHCONH_2$) is described in a literature [B. C. Sekhar, J. Polymer Science, Vol. XLVIII, 133 (1960)] in which the results of screening of additives having a viscosity-stabilizing effect on natural rubber are shown. Further, hydroxylamine, semicarbazide and dimedone (1,1-dimethylcyclohexane-3,5-dione) are disclosed as additives for natural rubber which are likely to have a viscosity-stabilizing effect.

However, the respective compounds are expensive, and it has been confirmed that if an amount used is so small though it is scattered, the viscosity-stabilizing effect is basically low from the beginning or the viscosity rises after some period while the viscosity-stabilizing effect is observed at the beginning.

The following two matters can be considered as the cause thereof.

a) Sufficiently high dispersion can not be obtained because of addition in a small amount.
b) An amount of some level is required in order to block an aldehyde group which is considered to cause gelation.

On the other hand, it is well known that carbon black and silica are added as reinforcing fillers for rubber.

However, it is not known at all that carbon black and silica prevent gelation (storage hardening) of natural rubber, that is, have a viscosity-stabilizing effect.

SUMMARY OF THE INVENTION

An object of the present invention is to solve the conventional problems described above and to provide a low-cost viscosity stabilizer for natural rubber having a viscosity-stabilizing effect continuing over an extended period of time, a viscosity-stabilized natural rubber composition blended with said viscosity stabilizer and a production process for the same, and a method of controlling a rise in the viscosity of natural rubber in which said viscosity stabilizer is used for controlling a rise in the viscosity of natural rubber.

Intensive investigations made by the present inventors in order to solve the conventional problems described above have resulted in finding that the specific rubber compounding agents already used as compounding agents for rubber have a viscosity-stabilizing effect. Further researches have resulted in successfully obtaining a viscosity stabilizer for natural rubber, a viscosity-stabilized natural rubber composition and a production process for the same, and a method of controlling a rise in the viscosity of natural rubber, and thus coming to complete the present invention.

That is, the viscosity stabilizer for natural rubber according to the present invention is characterized by comprising carbon black and/or silica. In addition, at least one selected from the group consisting of a plasticizer, a processing aid, a softening agent and a dispersant (hereinafter referred to as rubber chemicals) may be added to them.

The viscosity-stabilized natural rubber composition of the present invention is prepared by blending natural rubber with the viscosity stabilizer described above.

In the process for producing the viscosity-stabilized natural rubber composition of the present invention, the viscosity stabilizer described above is added to natural rubber latex in producing a natural rubber master batch to produce the viscosity-stabilized natural rubber composition.

In the method of controlling a rise in the viscosity of natural rubber according to the present invention, the viscosity stabilizer described above is added to natural rubber latex in producing a natural rubber master batch to control a rise in the viscosity of natural rubber. The viscosity stabilizer is added preferably in an amount of 5 to 80 parts by weight per 100 parts by weight of natural rubber.

The reason why the viscosity stabilizer for natural rubber according to the present invention has a viscosity-stabilizing property is presumed as follows. That is, it is considered that carbon black and silica used for natural rubber reacts with an aldehyde group contained in an isoprene chain to block the aldehyde group, thereby preventing a gelation reaction with protein and the like contained in natural rubber to control a rise in the viscosity due to gelation, and that as a result, natural rubber is provided with a viscosity-stabilizing property.

Since the viscosity-stabilized natural rubber composition of the present invention is blended with carbon black and/or silica which provide natural rubber with a viscosity-stabilizing property, gelation of natural rubber is prevented, and a rise in the viscosity of natural rubber is controlled over a long period of time.

The viscosity-stabilized natural rubber composition of the present invention exhibits an excellent viscosity-stabilizing effect over an extended period of time, and therefore treatment such as mastication is not required in using. This can improve the production efficiency to a large extent at a kneading stage after mastication and can reduce the addition of carbon black and silica as reinforcing fillers. Accordingly, the kneading efficiency is elevated, and the processability can be improved as well to a large extent. Further, bale deformation (cold flow) is not caused. In addition, materials which have so far been used in the rubber industry are blended as a viscosity stabilizer, and therefore no any influences are exerted on the physical properties of rubber after vulcanization.

In the process for producing the viscosity-stabilized natural rubber composition of the present invention, carbon black and/or silica having the viscosity-stabilizing property described above are merely added to natural rubber latex in producing a natural rubber master batch, whereby the viscosity-stabilized natural rubber composition preventing the gelation of natural rubber and controlling a rise in the viscosity over a long period of time can be produced. Accordingly, no specific modifications are required for conventional natural rubber production steps.

Further, in the method of controlling a rise in the viscosity of natural rubber according to the present invention, carbon black and/or silica having the viscosity-stabilizing property described above are merely added to natural rubber latex in producing a natural rubber master batch, whereby the gelation of natural rubber is prevented, and therefore a rise in the viscosity of natural rubber can be controlled. In addition, the method described above is safe in terms of handling.

DESCRIPTION OF THE PREFERRED EMBODIMENTS

The embodiment of the present invention shall be explained in detail.

The viscosity stabilizer of the present invention comprises carbon black and/or silica, and at least one selected from the group consisting of a plasticizer, a processing aid, a softening agent and a dispersant may further be added thereto.

As explained in the paragraph of Description of the Related Art, these carbon black and silica are known materials and used as reinforcing fillers for rubber, and the production processes for the same are known as well. However, it has not so far been known at all that they exhibit a viscosity-stabilizing effect on natural rubber, and such new properties have been found by the present inventors. They can be handled safely and are available at low costs. As apparent from the examples described later, when they are used for natural rubber, a viscosity-stabilizing effect is displayed from the time of addition and maintained over an extended period of time.

A range of applying carbon black and silica as the viscosity stabilizers can distinctly be distinguished from a range of using them as conventional reinforcing fillers.

That is, carbon black and silica used as conventional reinforcing fillers are added at a step of preparing compounded rubber before vulcanizing and molding in producing rubber products, while carbon black used as the viscosity stabilizer of the present invention is added when natural rubber latex is processed to produce a master batch of natural rubber used as a raw material of the rubber products. Accordingly, the applying scopes such as an applying step and an applying timing in both uses can clearly be distinguished, and the particularly marked effect described above is displayed in the scope of using them as the viscosity-stabilizing agent.

The viscosity-stabilized natural rubber composition of the present invention is produced by adding carbon black and/or silica and the rubber chemicals described previously to natural rubber latex and/or dried natural rubber, for example, TSR (natural rubber obtained after drying by hot air) and RSS (natural rubber obtained after drying by smoking) and kneading them by means of a mixer or an extruder in producing a natural rubber master batch, or at a step of manufacturing the natural rubber master batch produced in the process of tapping-natural rubber latex-coagulation-cleaning (washing by water)-dehydration-drying-packing, and can be molded into sheet-shaped and bale-shaped articles.

The kneading conditions are varied depending on the kind and grade of natural rubber used (produced), and the kneading is carried out preferably for 45 seconds or more, preferably 60 seconds or more to come to a discharging temperature of 130° C. or higher.

Further, in the method of controlling a rise in the viscosity of natural rubber according to the present invention, carbon black and/or silica and the rubber chemicals described previously are added to natural rubber in producing the natural rubber master batch described above, whereby a rise in the viscosity of natural is controlled.

When they are added to natural rubber after drying, they have to be added to natural rubber subjected to drying treatment as early as possible since gelation (storage hardening) goes on even when left for standing at room temperature.

The viscosity-stabilized natural rubber composition of the present invention controls a rise in the viscosity caused by the gelation of the polymer of natural rubber by compounding carbon black and/or silica, thereby producing a viscosity-stabilizing effect. This viscosity-stabilized natural rubber composition has a higher viscosity than that of natural rubber itself because of compounding of carbon black and/or silica, but a subsequent rise in the viscosity is limited, that is, a rise in the viscosity attributable to the gelation of the polymer is not found and thus the viscosity-stabilizing effect is exerted.

A viscosity-stabilized natural rubber composition obtained by adding a conventional viscosity stabilizer has large bale deformation (cold flow) because of a low viscosity level and therefore has a little defect that handling is difficult. However, in the viscosity-stabilized natural rubber composition of the present invention, the viscosity is maintained, as described above, at a high level as compared with those obtained by adding conventional viscosity stabilizers, and therefore bale deformation (cold flow) is not found, which in turn elevates the workability.

Carbon black usually used in the rubber industry can be used in the present invention.

Carbon black of various grades such as SAF and HAF can be used alone or in combination in the present invention. As for silica, silicic acid anhydrous of fine powder usually used as a white reinforcing filler for rubber is used.

As the rubber chemicals, stearic acid and zinc oxide are used.

In the present invention, carbon black or silica can be used alone and in addition thereto, there can be used carbon black in combination with silica, carbon black in combination with the rubber chemicals, silica in combination with the rubber chemicals, and carbon black and silica in combination with the rubber chemicals.

The viscosity stabilizer is added in total in an amount of 5 to 80 parts by weight, preferably 40 to 70 parts by weight per 100 parts by weight of natural rubber.

The amount of this viscosity stabilizer of less than 5 parts by weight makes it impossible to provide a viscosity-stabilizing effect, and the amount exceeding 80 parts by weight deteriorates the properties of rubber as well as the workability. That is, the sheet becomes ragged and breaks, so that a continuous operation of producing a natural rubber master batch undersirably stops each time.

The amounts of carbon black and silica added later as reinforcing fillers for rubber can be reduced or set at zero in case that they are used in the above-mentioned range of 40 to 70 parts by weight. Thus, the workability of an after-kneading step is improved, and the properties of the rubber obtained after the addition are not deteriorated.

The addition amount described above is varied to some extent in the range described above depending on the kind and the grade of natural rubber used (produced) and the kind of the viscosity stabilizer used.

EXAMPLES

Next, specific and detailed explanations shall be given to the present invention with reference to examples and comparative examples, but the present invention shall not be restricted to these examples.

The respective natural rubber compositions prepared in the examples and the comparative examples were measured for a change in a Mooney viscosity with the passage of time to evaluate a viscosity-stabilizing effect. Further, the properties of the rubbers, the handling property and the productivity were evaluated as well.

The Mooney viscosity, the properties of the rubbers, the handling property and the productivity were determined and evaluated by the following methods.

(1) Mooney Viscosity (JIS K6300)

In order to check whether the viscosity is stabilized, the respective natural rubber compositions were left for standing at room temperature to be stayed in a hardening-accelerating condition, whereby a change in the Mooney viscosity with the passage of time was determined.

(2) Property of Rubber

The respective natural rubber compositions were evaluated with naked eyes according to the following evaluation criteria.

Evaluation Criteria:

⊙: good

○: a little good x: ragged and unsuitable to transportation

(3) Handling Property

The respective natural rubber compositions were evaluated with naked eyes according to the following evaluation criteria.

Evaluation criteria:

⊙: good handling property and suitable to transportation

○: a little good handling property x: large deformation and not preferred

(4) Productivity

The total (from mastication to final kneading stage) productivity (time and cost required for processing) was shown by index, wherein the productivity of Comparative Example 1 was set at 100. The higher the value is, the more the productivity is improved.

Examples 1 to 5 and Comparative Examples 1 to 2

Carbon black, which has a viscosity-stabilizing effect, was added in the proportions shown in the following Table 1 based on 100 parts by weight of natural rubber (PSR type), and the mixtures were kneaded by means of a banbury mixer to prepare the respective natural rubber compositions.

In Examples 1 to 3 and Comparative Example 1, the mixtures were put into the mixer at 50 to 60° C. and kneaded for 60 seconds to come to a discharge temperature of 130° C., and in Examples 4 and 5 and Comparative Example 2, the mixtures were kneaded for 60 seconds to come to a discharge temperature of 160° C.

The blend proportions and the evaluation results are shown in Table 1.

Examples 6 to 10 and Comparative Example 3

Silica, which has a viscosity-stabilizing effect, was added in the proportions shown in the following Table 2 based on 100 parts by weight of natural rubber (PSR type), and the mixtures were kneaded by means of the banbury mixer to prepare the respective natural rubber compositions.

In Examples 6 to 8, the mixtures were put into the mixer at 50 to 60° C. and kneaded for 60 seconds to come to a discharge temperature of 130° C., and in Examples 9 and 10 and Comparative Example 3, the mixtures were kneaded for 60 seconds to come to a discharge temperature of 160° C.

The blend proportions and the evaluation results are shown in Table 2.

Examples 11 to 12

The rubber compositions were prepared in the same manner as in Example 3, except that carbon black and silica, each of which has a viscosity-stabilizing effect, were used in combination in the proportions shown in the following Table 2, or carbon black, silica and stearic acid were used in combination.

The blend proportions and the evaluation results are shown in Table 2.

TABLE 1

|  | Comparative Example 1 | Example 1 | Example 2 | Example 3 | Example 4 | Example 5 | Comparative Example 2 |
|---|---|---|---|---|---|---|---|
| Natural rubber | 100 | 100 | 100 | 100 | 100 | 100 | 100 |
| Carbon black | 0 | 5 | 40 | 50 | 70 | 80 | 90 |
| Mooney viscosity |  |  |  |  |  |  |  |
| just after kneading | 70 | 76 | 90 | 112 | 151 | 173 | 194 |
| After 30 days (100° C.) | 82 | 76 | 91 | 113 | 152 | 174 | 194 |
| After 60 days (100° C.) | 88 | 77 | 91 | 113 | 153 | 174 | 195 |
| After 90 days (100° C.) | 91 | 77 | 92 | 113 | 153 | 175 | 195 |
| Property of rubber | ⊚ | ⊚ | ⊚ | ⊚ | ○ | ○ | x |
| Handling property | x | ⊚ | ⊚ | ⊚ | ⊚ | ⊚ | x |
| Productivity | 100 | 115 | 160 | 160 | 160 | 160 | — |

TABLE 2

|  | Comparative Example 1 | Example 6 | Example 7 | Example 8 | Example 9 | Example 10 | Comparative Example 3 | Example 11 | Example 12 |
|---|---|---|---|---|---|---|---|---|---|
| Natural rubber | 100 | 100 | 100 | 100 | 100 | 100 | 100 | 100 | 100 |
| Carbon black | 0 | — | — | — | — | — | — | 45 | 45 |
| Silica | 0 | 5 | 40 | 50 | 70 | 80 | 90 | 5 | 5 |
| Stearic acid | — | — | — | — | — | — | — | — | 1 |
| Mooney viscosity |  |  |  |  |  |  |  |  |  |
| just after kneading | 70 | 74 | 83 | 98 | 124 | 139 | 153 | 110 | 105 |
| After 30 days (100° C.) | 82 | 74 | 84 | 99 | 124 | 140 | 153 | 111 | 106 |
| After 60 days (100° C.) | 88 | 75 | 85 | 100 | 126 | 140 | 154 | 111 | 106 |
| After 90 days (100° C.) | 91 | 76 | 86 | 100 | 126 | 142 | 155 | 112 | 106 |
| Property of rubber | ⊚ | ⊚ | ⊚ | ⊚ | ○ | ○ | x | ⊚ | ⊚ |
| Handling property | x | ⊚ | ⊚ | ⊚ | ○ | ○ | x | ⊚ | ⊚ |
| Productivity | 100 | 110 | 140 | 140 | 140 | 140 | — | 156 | 162 |

Examples 1 to 12 fall in the scope of the present invention, and it has been confirmed that the respective natural rubber compositions do not rise in a Mooney viscosity and have a viscosity-stabilizing effect. Further, it has become clear that the properties and the handling properties of the rubbers are good and the mastication can be eliminated and that the productivity can be elevated to a large extent.

In contrast with this, it has been confirmed that in Comparative Example 1, the Mooney viscosity rises to a large extent as time goes on and the mastication is required and that the deformation is large and therefore the handling property is deteriorated.

The blend amount of carbon black is as large as 90 parts by weight in Comparative Example 2, and the blend amount of silica is as large as 90 parts by weight in Comparative Example 3. Accordingly, it has been confirmed that the rubbers show a ragged property and the handling property is deteriorated and that such amount is not preferred.

What is claimed is:

1. A process for producing a natural rubber master batch composition, which comprises adding a viscosity stabilizer comprising carbon black, silica or a mixture thereof to a natural rubber latex and kneading them for 45 seconds or more to come to a discharging temperature of 130° C. or higher, thereby producing a natural rubber master batch composition having a viscosity which is stable over time, wherein the viscosity stabilizer is added in an amount of 40 to 70 parts by weight per 100 parts by weight of natural rubber.

2. A process for producing a natural rubber master batch composition as claimed in claim 1, wherein the viscosity stabilizer further comprises at least one additive selected from the group consisting of a plasticizer, a processing aid, a softening agent and a dispersant.

3. A method for preventing an increase in the viscosity of natural rubber over time, which comprises adding a viscosity stabilizer comprising carbon black, silica or a mixture thereof to a natural rubber latex and kneading them for 45 seconds or more to come to a discharging temperature of 130° C. or higher to produce a natural rubber master batch composition, wherein the viscosity stabilizer is added in an amount of 40 to 70 parts by weight per 100 parts by weight of natural rubber.

4. The method for preventing an increase in the viscosity of natural rubber over time as claimed in claim 3, wherein the viscosity stabilizer further comprises at least one additive selected from the group consisting of a plasticizer, a processing aid, a softening agent and a dispersant.

* * * * *